United States Patent [19]

Kohrman et al.

[11] 3,947,247

[45] Mar. 30, 1976

[54] STABILIZER COMPOSITION FOR DYESTUFFS

[75] Inventors: Robert E. Kohrman; Pratap G. Phadtare, both of Mount Pleasant, Mich.

[73] Assignee: Central Michigan University Board of Trustees, Mount Pleasant, Mich.

[22] Filed: Oct. 31, 1973

[21] Appl. No.: 411,195

[52] U.S. Cl. .................................... 8/44; 252/357
[51] Int. Cl.² ................ C09B 27/00; B01F 17/16
[58] Field of Search ............... 8/44, 45; 252/357; 260/286 Q, 290 R, 295 T

[56] References Cited
UNITED STATES PATENTS

| | | | |
|---|---|---|---|
| 2,042,696 | 6/1936 | Bader | 8/44 |
| 2,214,559 | 9/1940 | Lecher | 8/44 |
| 2,402,611 | 6/1946 | Dickey | 8/44 |
| 2,815,259 | 12/1957 | Glietenberg | 8/45 |
| 2,953,422 | 9/1960 | Posselt | 8/45 |
| 3,003,844 | 10/1961 | Jelinek | 8/45 |
| 3,081,141 | 3/1963 | Harmuth | 8/45 |

*Primary Examiner*—Richard D. Lovering
*Assistant Examiner*—Donald P. Walsh
*Attorney, Agent, or Firm*—Basile and Weintraub

[57] ABSTRACT

A stabilizer compound for dyestuffs is prepared by reacting a quaternary heterocyclic nitrogeneous compound and an azo derivative. The reaction is carried out in a non-acid medium. The stabilizers produced from the condensation reaction hereof can be subsequently reacted with suitable dye forming or coupling compounds to form a dyestuff. Dyestuffs produced hereby are useful in dyeing both natural or cellulosic fibers as well as synthetic fibers. The products hereof are useful as printing compositions and evidence excellent shelf life.

10 Claims, No Drawings

STABILIZER COMPOSITION FOR DYESTUFFS

BACKGROUND OF THE INVENTION

1. Field of the Invention

The present invention relates to stabilizers for dyestuffs. More particularly, the present invention relates to stabilizers or precursors for dyestuffs which are useful in the dyeing of both natural and synthetic fibers. Even more particularly, the present invention relates to dyestuff precursors or stabilizers, prepared by a condensation reaction in a non-acid medium, which are useful in the preparation of azoic dyes. The invention also relates to the dyes prepared therefrom, the dyes being efficacious in the dyeing of both natural and synthetic fibers.

2. Prior Art

The prior art is replete with azoic compositions useful in the dyeing of fibrous material. Generally speaking, these compositions comprise azoitized amino compounds which are prepared in the presence of an acid medium. The predominant bulk of these compositions or dyestuffs are usually derived from aniline and related compounds. See, inter alia, U.S. Pat. No. 1,858,623; 1,979,327; and the like.

With the advent of new synthetic textiles and fibers the art has given way to the development of dyestuffs which must be more compatible with these new fibers. Thus, the basic azo dyestuffs must be stabilized or otherwise complexed with other compounds to render them more receptive by the fiber. Concomitantly, the art has developed more sophisticated dyestuffs designed to achieve these same purposes.

However, the new dyestuffs being produced are generally quite exotic and, therefore, expensive and difficult to manufacture in industrial quantities. Moreover, the dyestuffs being produced are incapable of being used with a plurality of fibrous materials. In other words, a dyestuff useful for dyeing a polyester fabric will, generally, be incapable of dyeing a natural fiber, such as, cotton or wool, and vice versa.

Thus, a major advance in the art would be provided by new dyestuffs useful in the dyeing of both natural and synthetic fibers. There would also be a major advance in the art if such dyestuffs could be manufactured inexpensively from readily available chemicals. It is these ends to which the present invention is directed.

SUMMARY OF THE INVENTION

In accordance with the present invention there is provided dyestuff precursors or stabilizers which are obtained by the condensation reaction in a non-acid medium of an azoitized aromatic amine and a quaternary aromatic heterocyclic nitrogeneous compound.

The resulting precursors may then be admixed with any suitable coupling agent to obtain the final dye or dyestuff.

The dyestuffs produced in accordance herewith are useful in dyeing both natural and synthetic fibers. Moreover, these dyestuffs can be used in printing compositions.

For a more complete understanding of the present invention reference is made to the following detailed description and examples thereof.

DESCRIPTION OF THE PREFERRED EMBODIMENTS

As hereinbefore noted, and in accordance with the present invention dyestuff precursors or stabilizers are prepared by the condensation reaction of an azoitized aromatic amine and a quaternary heterocylic nitrogeneous compound. The reaction is carried out in the presence of a non-acid reaction medium i. e. in an aqueous medium having a pH of at least about 7.

The reaction medium is preferably an aqueous system or a slightly basic aqueous system. By the term "slightly basic aqueous system" is meant an aqueous solution having dissolved therein acid binding agents, such as, the salt of a weak acid. Examples of such salts include sodium carbonate, sodium bicarbonate, potassium carbonate, potassium bicarbonate, lithium carbonate and the like. Although not preferred it is possible to use dilute solutions of alkali metal hydroxides, such as, sodium hydroxide, potassium hydroxide, lithium hydroxide and the like. Also, it is possible, but not preferred to use aqueous solutions of alkali metal phosphates, such as sodium phosphate and the like.

In carrying out the present invention it is preferred than an aqueous sytem be employed having a pH of from about 7 to about 9 and wherein the acidity of the aqueous system, where present, is provided by the salt of a weak acid, as above defined.

The azoitized aromatic amine employed in the practice of the present invention generally corresponds to the formula:

wherein A is the residue of any primary aromatic amine which is capable of being azoitized and coupled and which is free from any solubilizing groups detrimental to azoic dyeing, and wherein $n$ is 1 or 2. Thus, it is seen that the present invention contemplates the use of either diazo - or tetrazoamino compounds.

The azoitizable aromatic amine, as noted, is a primary amine which may be either heterocyclic or homocyclic. Furthermore, these compounds may be either substituted or unsubstituted about their respective rings.

Representative of the unsubstituted heterocyclic and homocyclic aromatic amines useful in the practice hereof are, for example, aniline, pyridine, quinoline, isoquinoline, and the like.

Other useful compounds include, for example, toludine, benzidine, naphthylamines, nitrotolidine, acetanilides, nitroaniline, hydroquinolines, hydroisoquinolines, aminocontaining anthracenes and phenanthracenes, and the like.

In the practice of the present invention, as above-noted, any primary aromatic amines can be used herein. Also, and as above-noted, these compounds may be substituted or unsubstituted. Suitable substituents include alkyl, carboxyl, halo, hydroxyl, aralkyl, cycloalky, alkylaryl, carbonyl, alkoxy, and the like.

In the practice of the present invention the preferred aromatic amines are aniline and substituted anilines. Suitable substituents include, for example, halo, alkoxy, nitro, hydroxy, alkyl, and the like, as well as combinations thereof. Particularly, preferred primary aromatic amino compounds include, for example, aniline, toluidine, chloroanilines, methoxyanilines, chloromethoxyanilines, aminophenols, chloroaminophenols, nitroanilines, and the like, and mixtures thereof.

The primary aromatic amines are azoitized prior to reaction with the quaternary compound by conventional azoitizing processes. Generally speaking, the amines are azoitized by acidifying the amine with a mineral acid followed thereafter by the reaction of the acidified amine with a strong basic compound which promotes coupling to form a diazonium (or tetrazonium) salt. Typically, the amine is reacted at ambient conditions as an aqueous solution thereof with hydrochloric acid. Other acids can be used, such as, sulfuric acid and the like, but hydrochloric acid is preferred.

The reaction with the basic compound is carried out at reduced temperatures ranging from about 0°C to about 10°C. This is usually achieved by cooling the acidified amine and adding thereto the basic compound. Although other strongly basic compounds can be employed, it is preferred to employ sodium nitrite. The resulting diazonium (or tetrazonium) salt can then be used either as an aqueous solution thereof or as a recovered concentrate.

The resulting azoitized amine, as above noted, is reacted or condensed with a quaternized heterocyclic nitrogenous compound to obtain the stabilizers hereof. Also, as noted above, the reaction is carried out in a non-acid medium.

The quaternized heterocyclic nitrogenous compounds contemplated for use herein is generally prepared by quaternizing any heterocyclic nitrogeneous compound which is amenable to quaternization. Useful heterocyclic nitrogeneous compounds include, for example, pyridine, quinoline, isoquinoline, azaphenanthrene, and the like. Furthermore, the heterocyclic compounds may be substituted or unsubstituted. Suitable substituents include, for example, hydrogen, aralkyl, cycloalkyl, alkyl, carboxyl, glycine, amino, nitro, halo, alkoxy, sulfonic acid, and the like.

In the practice of the present invention it is preferred to employ pyridine, and in particular an aminopyridine, as the heterocyclic nitrogeneous compounds. The preferred compounds hereof generally correspond to the formula:

wherein $R_1$, is either hydrogen, lower alkyl having from about 1 to 4 carbon atoms, cycloalkyl, aralkyl, glycine, alkenyl, alkynyl, aryl and the like, $R_2$ and $R_3$ are each, individually either hydrogen, alkyl, aralkyl, cycloalkyl, aryl, alkenyl, alkynyl, halo, nitro, hydroxy, carboxy, alkoxy, or a sulfonic acid group, and the like.

The aminopyridines preferably employed herein have the amino group, preferentially, at either the 2, 4 or 6 positions, although the placement of the amino group at the other positions about the ring is not detrimental.

The aminopyridines are quaternized with suitable alkylating agents under conventional alkylation conditions. Typical alkylating agents include, for example, the esters of strong mineral acids and organic sulfonic acids, alkyl halides, such as alkyl chlorides, alkyl bromides, and alkyl iodides, aralkyl halides, dialkyl sulfates and substituted or unsubstituted benzenesulfonic esters.

After quaternization, the resulting product is recovered by conventional techniques, such as, filtration, solvent evaporation, or precipitation from a solvent.

Although other anions can be employed such as halo, sulfonate, alkyl sulfate, and the like, it is preferred to recover the quaternary compound as the hydroxide. This promotes and enhances the shelf life of the product.

The preferred quaternary aminopyridines contemplated hereby can be represented by the formula:

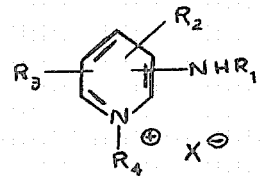

wherein $R_1$, $R_2$, and $R_3$ are as defined above, $R_4$ is either substituted or unsubstituted alkyl, aralkyl, or cycloalkyl, and X is the anion used in the alkylation and is preferably, hydroxy.

The condensation reaction generally proceeds at a temperature ranging from about $-10°C$ to about $25°C$, and preferably at a temperature ranging from about $-5°C$ to about $10°C$. In carrying out the reaction, the quaternary compound and the azoitized amine are generally employed in stoichiometric equivalents of about 1:1, although it is preferred to have an excess of quaternary compounds based on the stoichiometry of the reaction. The reaction, depending on the amounts of ingredients, is generally completed in a minimum of about five minutes with no outer time limit, and is usually completed in about 1 to 3 hours.

The stabilizers produced by the condensation reaction correspond to the formula:

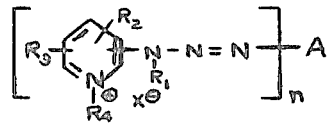

wherein $R_1$, $R_2$, $R_3$, $R_4$, X, A and n have the above-provided definitions.

The resulting stabilizers are coupled with any suitable coupling agent, such as naphthol, in stoichiometric equivalents to obtain the final dyestuff.

In dyeing a fabric with the dyestuff, the dyeing process is steam initiated, either acid or neutral. Since neutral steaming can be employed the difficulties encountered with acid steaming can be avoided. This is achieved by balancing the basicity of the quaternary compound with the reaction of the azoitized amine. Dyestuffs produced in accordance herewith can be used to dye either cellulosic or synthetic fibers, both, with equal efficacy.

It should be noted in this regard that some substituents on he stabilizer render it more amenable for dyeing cellulosic fabrics and others render it more amenable for dyeing synthetics.

Thus, in the dyeing of cellulosic fabrics it is preferred that the stabilizers correspond to the formula:

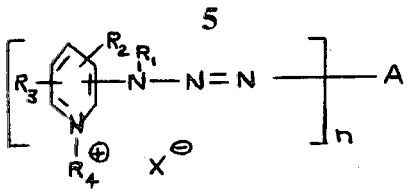

wherein $R_4$, A and n are as defined above, $R_1$, is either hydrogen, glycine, alkyl, substituted alkyl, cycloalkyl, alkenyl, alknynyl, aryl, aralkyl, and the like, $R_2$ and $R_3$ are each, individually, sulfones, sulfonamides, hydroxy, alkoxy, as well as the substituents enumerated for $R_1$.

With the dyeing of synthetic fabrics, such as hexamethylene adipamide, other polyesters and the like, $R_1$ is either hydrogen, alkyl, or substituted alkyl; $R_2$ and $R_3$ are each, individually, hydroxy, nitro, halo, slkoxy, alkyl, hydrogen, and the like. However, carboxy and sulfonic substituents should be avoided for $R_2$ and $R_3$ when preparing dyestuffs for synthetic fabrics.

It should be also noted that the stabilizers hereof, in addition to their use as dyestuffs can be used for producing metallized azoic dyes by the condensation reaction hereof using an appropriately substituted diazonium compound having ligand donor sites e.g., aminophenols.

Furthermore, and as noted hereinbefore, the stabilizers hereof can be used as printing compositions. In this regard it has been found that by admixing ammonium chloride in the printing composition or pastes hereof, neutral steaming development can be used.

Also, it should be noted that in deploying dyestuffs prepared in accordance herewith, color development may be facilitated through anion exchange of the stabilizer by conventional techniques.

For a more complete understanding of the present invention, reference is made to the following illustrative examples. In the examples, which are not to be construed as limitative of the invention, all parts are by weight, absent indications to the contrary.

EXAMPLE 1

Into a suitable reaction vessel equipped with stirring means, and cooling means, 10.7 parts of p-toluidine was dissolved in 140 parts of water and 28.5 parts of 20 Be hydrochloric acid. With stirring the amine hydrochloride solution was cooled to 0°–5°C and was diazotized, by the dropwise addition of 28 ml of a 25% (weight/volume) sodium nitrite solution. The diazonium salt solution so obtained was then added in a drop-wise fashion over a one hour period to a mixture of 26.5 parts of 1-methyl-2-aminopyridinium methosulfate, 250 parts of water, and 45 parts of sodium carbonate. The diazo salt solution was added below the surface of the solution, and the stirred mixture was maintained at 0° to −3°C during the addition. The reaction mixture was stirred for an additional 2 hours after the addition of the diazonium salt at 0° to −3°C after which most of the diazonium salt solution was consumed. The resulting stabilizer corresponding to the formula:

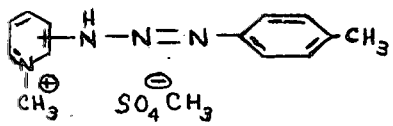

separated out as a yellow precipitate. The reaction mixture was further stirred for six hours and the product was isolated by suction filtration, washed with a minimum amount of water, and dried at 20°–30°C. Thirty parts of the stabilizer were obtained as a yellow powder.

EXAMPLE II

Following the procedure of Example I, 12.8 parts of m-chloroaniline was diazotized at 0°–5°C with 29.0 ml of 20 Be hydrochloric acid and 28 ml of a 25% (weight/volume) sodium nitrite solution. The filtered diazonium salt solution was then reacted with 27 parts of 1-methyl-2-aminopyridinium methosulfate dissolved in 300 parts of water and 53 parts of sodium carbonate. After stirring the reaction mixture for two additional hours at 0° to −3°C, the mixture was rendered distinctly alkaline by the addition of a minimum amount of caustic soda solution (pH=12) and was stirred overnight. The product is filtered, washed and dried at 20°–30°C. Twenty-three parts of diazoamino compound were obtained.

EXAMPLE III

Using a suitable vessle equipped with heating means, cooling means and stirring means, 13.0 parts of 2,5-dichloroaniline was dissolved by heating in 40 ml of 20 Be hydrochloric acid and 140 parts of water. The solution was cooled to 0°–5°C with an ice bath and by addition of pieces of ice. Twelve ml of 50% (weight/volume) sodium nitrite solution was then added, with stirring, for sixty minutes while maintaining the temperature at 0°–5°C. Then, following the procedure of Example I, the diazo solution was clarified and allowed to react with 26.0 parts of 1-methyl-2-amino-3, 5-dichloropyridinium methosulfate and 74.0 parts of sodium carbonate monohydrate dissolved in 400 parts of water. After two hours of stirring at 0° to −3°C the reaction mixture was neutralized with a minimum amount of caustic soda solution and stirred overnight. The yellow precipitated stabilizer was filtered, washed and dried at 20°–30°C. Thirty-two parts of the stabilizer, as a dry product, was obtained.

EXAMPLE IV

Following the procedure of Example III, 10.2 parts of m-chloroaniline was diazotized. The clarified diazo solution was added to 26.0 parts of 1-methyl-2-amino-3,5-dichloropyridinium methosulfate and 50 parts of sodium carbonate monohydrate dissolved in 300 parts of water the the reaction was carried out. After the addition was completed, the resulting mixture was stirred for two additional hours at the same temperature, and was then neutralized with the minimum amount of caustic soda solution and left to stir overnight. The resulting stabilizer was filtered, washed with a minimum amount of water, and dried at 20°–30°C.

EXAMPLE V

Following the procedure of Example I, 10.7 parts of p-toluidine was diazotized and then condensed with 28.5 parts of 1-methyl-2-aminopyridinium iodide.

EXAMPLE VI

Using equipment similar to that of Example III, with heating, 12.6 parts of 5-chloro-2-methoxyaniline was dissolved in 23 ml of 20 Be hydrochloric acid, 140 parts of water, and was diazotized with 5.6 parts of sodium nitrite at 0°–5°C. Using the procedure of Example I, the clarified diazo solution was added over a three hour period to 20 parts of 1-methyl-2-aminopyridinium methosulfate and 50 parts of sodium carbonate dissolved in 250 parts of water. After stirring for an additional 2 hours, the reaction mixture was neutralized with a minimum amount of caustic soda solution (pH=12) and stirred overnight. The precipitated stabilizer was filtered, washed, and dried at 25°–30°C. Twenty-three and four-tenths parts of the product was obtained.

EXAMPLE VII

Example VI was repeated using 14.2 parts of 4-chloro-2-methylaniline as the aromatic amine.

EXAMPLE VIII

Example VI was repeated using 13.5 parts of 2-methoxy-5-nitroaniline as the aromatic amine.

EXAMPLE IX

Example VI was repeated using 11.4 parts of 5-chloro-2-methylaniline as the aromatic amine.

EXAMPLE X

Example VI was repeated using 12.2 parts of 2-methyl-4-nitroaniline as the aromatic amine.

EXAMPLE XI

This example illustrates the use of a tetrazonium salt.

In a suitable reaction vessel 9.8 parts of dianisidine was triturated at 0°–5°C in 50 parts of water and 20.5 ml of 20° Be hydrochloric acid. The mixture was tetrazotized by adding 22.4 ml of 25% (weight/volume) sodium nitrite solution thereto. After stirring for 1 hour, the tetrazo solution was filtered. One-half of the filtrate solution was added to 20.0 parts of 1-methyl-2-aminopyridinium methosulfate, 25.0 parts of sodium carbonate monohydrate and 4.0 parts of sodium hydroxide dissolved in 200 parts of water. The addition was carried out at a temperature between −2° and −3°C, using the procedure of Example I. An additional amount of the solution containing 150 parts of water, 25 parts of sodium carbonate monohydrate, and 4.0 parts of sodium hydroxide was then added. The remaining tetrazo solution was then added to the solution, using the same procedure, while maintaining the temperature between 0° and −3°C. The total reaction mixture was then stirred for an additional two hours with the temperature maintained below 0°C. At this point most of the diazo solution was consumed, and the mixture was stirred overnight. The precipitated stabilizer was filtered, washed and dried at 20°–30°C.

EXAMPLE XII

Example VI was repeated using 12.6 parts of 4-chloro-2-methoxyaniline as the aromatic amine and 21.5 parts of 1-methyl-2-amino-6-methylpyridinium methosulfate as the quaternized heterocyclic nitrogeneous compound.

EXAMPLE XIII

Example VI was repeated using 11.0 parts of 2-methoxy-5-methylaniline as the aromatic amine and 23.0 parts of 1-methyl-2-amino-6-methylpyridinim iodide as the quaternized heterocyclic nitrogeneous compound.

EXAMPLE XIV

In a suitable vessel equipped with stirring means and cooling means 14.4 parts of 4-chloro-2-aminophenol was dissolved in a solution of 4.5 parts of sodium hydroxide in 200 parts of water. The solution was cooled in an ice bath and 40 ml of 20° Be hydrochloric acid was added with stirring. The solution was then cooled to 0°–5°C and diazotized with 7.0 parts of sodium nitrite. The diazo solution was filtered and was next added to 27.0 parts of 1-methyl-2-aminopyridinium methosulfate and 30.0 parts of sodium carbonate monohydrate dissolved in 100 parts of water using the procedure of Example I. During the condensation, the temperature was maintained at 0° to 3°C and the alkalinity was regulated by the regular addition of 10% sodium carbonate solution. The reaction mixture was stirred for an additional four hours after completion of the addition. The precipitated stabilizer was filtered, washed with a minimum amount of water and dried at 20°–30°C under vacuum.

EXAMPLE XV

Example XIV was repeated using 15.4 parts of 5-nitro-2-aminphenol as the amine and 29.0 parts of 1-methyl-2-aminopyridinium iodide as the quaternized heterocyclic nitrogeneous compound.

EXAMPLE XVI

Example XIV was repeated using 15.4 parts of 4-nitro-2-aminophenol as the amine and 30.0 parts of 1-methyl-2-amino-6-methylpyridinium iodide as the quaternary compound.

EXAMPLE XVII

Example XIV was repated using 14.4 parts of 4-chloro-2-aminophenol as the amine and 30.0 parts of 1-methyl-2-amino-6-methylpyridinium iodide as the quaternary compound.

Having thus described the invention what is claimed is:

1. A stabilizer composition composition consisting essentially of the condensation reaction product, in the presence of a non-acid medium, of a quaternary aromatic heterocyclic nitrogeneous compound and an azoitized aromatic amine.

2. The stabilizer of claim 1 wherein the quaternary aromatic heterocyclic nitrogeneous compound is selected from the group consisting of quaternized pyridines, quinolines, isoquinolines and azaphenanthrenes.

3. The stabilizer of claim 2 wherein the quaternary aromatic heterocyclic nitrogeneous compound is a quaternized pyridine.

4. The stabilizer of claim 1 wherein the azoitized aromatic amine is either a diazotized or tetrazoitized aromatic amine.

5. The stabilizer of claim 4 wherein the azoitized aromatic amine is an azoitized aniline.

6. A process for the preparation of a stabilizer composition comprising: condensing at a temperature of from about −10°C to about 25°C a quaternary aromatic heterocyclic nitrogeneous compound and an azoitized aromatic amine, the reaction being carried out in a non-acid medium.

7. The process of claim 6 wherein the quaternary aromatic heterocyclic nitrogeneous compound and the azoitized aromatic amine are employed in stoichiometric amounts.

8. The process of claim 6 wherein the non-acid medium is an aqueous solution of sodium carbonate or sodium carbonate monohydrate.

9. A dyestuff consisting essentially of a naphthol coupled with the stabilizer of claim 1.

10. In a process for dyeing a fabric, the improvement which comprises:

dyeing the fabric with the dyestuff of claim 9.

* * * * *